(12) United States Patent
Hollist (10) Patent No.: US 10,596,437 B2
(45) Date of Patent: Mar. 24, 2020

(54) ATHLETIC TRAINING SYSTEMS (71) Applicant: Grind Athletics, LLC, Saratoga Springs, UT (US)

(72) Inventor: Tyler J. Hollist, Saratoga Springs, UT (US)

(73) Assignee: GRIND ATHLETICS, LLC, Saratoga Springs, UT (US)

( * ) Notice: Subject to any disclaimer, the term of this patent is extended or adjusted under 35 U.S.C. 154(b) by 0 days.

(21) Appl. No.: 15/687,310

(22) Filed: Aug. 25, 2017

(65) Prior Publication Data

US 2018/0056162 A1    Mar. 1, 2018

Related U.S. Application Data

(60) Provisional application No. 62/381,505, filed on Aug. 30, 2016.

(51) Int. Cl.
*A63B 69/00* (2006.01)
*A63B 47/00* (2006.01)
(Continued)

(52) U.S. Cl.
CPC ...... *A63B 69/0097* (2013.01); *A63B 24/0075* (2013.01); *A63B 47/00* (2013.01); *A63B 69/00* (2013.01); *A63B 69/0002* (2013.01); *A63B 69/002* (2013.01); *A63B 69/0015* (2013.01); *A63B 69/0024* (2013.01); *A63B 69/0071* (2013.01); *A63B 69/0095* (2013.01); *A63B 69/38* (2013.01); *A63B 71/0036* (2013.01); *A63B 71/0622* (2013.01); *G09B 19/0038* (2013.01); *A63B 2102/065* (2015.10); *A63B 2209/00* (2013.01); *A63B 2209/10* (2013.01); *A63B 2210/50* (2013.01); *A63B 2225/09* (2013.01)

(58) Field of Classification Search
CPC ............ A63B 69/0097; A63B 69/0002; A63B 69/002; A63B 69/0024; A63B 69/0071; A63B 69/0095; A63B 69/00; A63B 69/38; A63B 71/0622; A63B 2210/50; A63B 24/0075; A63B 47/00; A63B 71/0036; A63B 2102/065; A63B 69/0015; A63B 2225/09; G09B 19/0038
USPC ....... 273/395; 473/435, 454, 459; 52/70, 71; 135/912, 913; 446/476, 479, 482; 312/210, 213, 326, 329; 160/128, 127, 160/351, 377
See application file for complete search history.

(56) References Cited

U.S. PATENT DOCUMENTS 92,113 A * 6/1869 Smith ..................... F26B 5/044
  34/192
931,669 A * 8/1909 Babcock ................ A47B 61/00
  211/125

(Continued)

*Primary Examiner* — Sebastiano Passaniti
(74) *Attorney, Agent, or Firm* — Durham Jones & Pinegar, P.C.

(57) ABSTRACT

The system is an athletic training station for individual and team sports. The station may be a ball-handling and passing station that includes a television with a virtual coach and training walls. The television may project a virtual trainer and the walls may allow a user to mimic passing and handling techniques by utilizing the walls of the station. The station may be stationary or portable. The station may include a front and a back portion that allow more than one user to utilize the station at a time.

19 Claims, 10 Drawing Sheets

(51) Int. Cl.
*A63B 71/00* (2006.01)
*A63B 69/38* (2006.01)
*G09B 19/00* (2006.01)
*A63B 71/06* (2006.01)
*A63B 24/00* (2006.01)
*A63B 102/06* (2015.01)

(56) References Cited

U.S. PATENT DOCUMENTS

| | | | | | |
|---|---|---|---|---|---|
| 1,363,130 | A | * | 12/1920 | William | F26B 9/06 312/213 |
| 1,440,944 | A | * | 1/1923 | Tarr | A63H 3/52 446/482 |
| 1,662,522 | A | * | 3/1928 | Laube | A61G 17/04 211/180 |
| 1,770,755 | A | * | 7/1930 | Kleinpell | A47F 7/163 160/135 |
| RE18,738 | E | * | 2/1933 | Gilmond | A63H 3/52 446/476 |
| 1,975,779 | A | * | 10/1934 | Church | A47B 61/00 312/296 |
| 2,631,046 | A | * | 3/1953 | Stephens | G09F 1/04 273/139 |
| 2,827,295 | A | * | 3/1958 | Austin | A63B 71/022 273/127 B |
| 3,408,071 | A | * | 10/1968 | Lundy | A63B 71/022 473/421 |
| 3,475,025 | A | * | 10/1969 | Uphaus | A63B 71/022 473/421 |
| 3,819,246 | A | * | 6/1974 | List | A47B 47/03 312/140 |
| 3,861,768 | A | * | 1/1975 | Wilson | A47F 5/135 280/33.995 |
| 3,926,487 | A | * | 12/1975 | Reyes | A47B 81/06 312/213 |
| 4,046,437 | A | * | 9/1977 | Caron | G09B 5/067 312/196 |
| 4,337,048 | A | * | 6/1982 | Hatch | A61B 5/16 434/219 |
| 4,344,660 | A | * | 8/1982 | Molnar | A63B 55/60 312/249.13 |
| 4,669,790 | A | * | 6/1987 | Briggs | A47B 21/03 312/223.3 |
| 4,702,534 | A | * | 10/1987 | Witt | G09F 15/0068 312/114 |
| 4,893,569 | A | * | 1/1990 | Hansen | B60C 25/147 109/1 S |
| 4,932,172 | A | * | 6/1990 | Maas | E04B 2/7427 312/297 |
| 4,974,843 | A | * | 12/1990 | Henningsson | A63B 47/025 473/431 |
| 5,205,564 | A | * | 4/1993 | Lamberti | A63B 63/004 273/400 |
| 5,415,311 | A | * | 5/1995 | Coogan | B65D 19/12 206/600 |
| 5,577,721 | A | * | 11/1996 | Hardee | A63B 71/022 473/421 |
| 5,584,546 | A | * | 12/1996 | Gurin | A47B 21/00 16/19 |
| 5,934,679 | A | * | 8/1999 | Strain | A63B 51/04 273/127 C |
| 6,379,272 | B1 | * | 4/2002 | Gorgo | A63B 71/022 273/407 |
| 6,505,898 | B1 | * | 1/2003 | Buchanan | A47B 46/00 312/213 |
| 6,692,092 | B1 | * | 2/2004 | Evans | A47B 46/00 312/249.9 |
| 6,722,750 | B2 | * | 4/2004 | Chan | A47B 43/00 312/257.1 |
| 6,991,566 | B1 | * | 1/2006 | McKinney, Sr. | A63B 69/0097 473/459 |
| 6,996,939 | B1 | * | 2/2006 | Jackson | A47B 43/00 160/351 |
| 7,055,833 | B2 | * | 6/2006 | Wixted | B62B 3/006 280/47.34 |
| 7,201,675 | B2 | * | 4/2007 | Morrison | A63B 24/0021 473/434 |
| 7,348,884 | B2 | * | 3/2008 | Higham | G06K 17/00 340/5.54 |
| 7,584,776 | B2 | * | 9/2009 | Hardt, II | E04B 2/7427 160/135 |
| 9,365,227 | B2 | * | 6/2016 | Shegerian | B62B 3/10 |
| 9,428,205 | B2 | * | 8/2016 | Jackson | B62B 3/025 |
| 9,889,361 | B2 | * | 2/2018 | Noll | A63B 69/0097 |
| 2005/0101417 | A1 | * | 5/2005 | Hamons | A63B 63/00 473/415 |
| 2005/0223665 | A1 | * | 10/2005 | Maas | E04B 2/7427 52/239 |
| 2009/0181810 | A1 | * | 7/2009 | Stephenson | A63B 63/004 473/446 |
| 2011/0037360 | A1 | * | 2/2011 | Jakins | A47B 63/04 312/237 |
| 2012/0244961 | A1 | * | 9/2012 | Dodds | A63B 71/022 473/421 |
| 2013/0130759 | A1 | * | 5/2013 | Boi | A63F 13/46 463/2 |
| 2014/0132131 | A1 | * | 5/2014 | Thomas | A45C 11/16 312/204 |
| 2016/0193793 | A1 | * | 7/2016 | Filippini | B29C 70/84 428/71 |
| 2018/0093160 | A1 | * | 4/2018 | Alhadeff | A63B 71/0622 |

\* cited by examiner

ATHLETIC TRAINING SYSTEMS

CROSS-REFERENCE TO RELATED APPLICATIONS

This application claims priority to U.S. Provisional Patent Application No. 62/381,505 entitled BALL HANDLING AND PASSING STATION filed Aug. 30, 2016, which is incorporated herein by reference in its entirety.

TECHNICAL FIELD

This disclosure relates generally to ball handling skills for athletes and, more specifically, a basketball athletic device for teaching athletes and players better ball handling and passing skills. The ball handling and passing station (the "Station") allows athletes to practice both individually and collectively their ball handling and passing with a virtual trainer and by themselves while creating the atmosphere of playing with other individuals or other players.

BACKGROUND

One or more trainers are normally needed to provide an athlete or group of athletes the verbal and visual instructions for great ball handling and passing. Particularly in team sports, multiple individuals are needed in order to acquire and maintain certain skills and to practice those skills consistently. The Station may give an athlete exceptional ball handling and passing experience through massive repetitions without massive cost and without the necessity of any other individual besides the user of the Station.

Currently, gyms, players, other athletes, and trainers are required to develop the skills necessary for appropriate ball handling and passing skills particularly in the field of basketball. Most venues hire multiple trainers and spend large sums of money on those trainers and the space needed to practice proper ball handling skills. Gyms, hoops, other players, trainers, space, and more are all required to develop the skills necessary to excel at the sport an athlete is striving to become better at.

Current devices on the market utilize video game platforms and software that must run on those platforms. In addition, these other platforms do not require the player to utilize an actual ball or other athletic device because the software is merely mimicking the player's movements (for example using an Xbox Kinect®). Furthermore, the devices currently utilized are made of wood or plastic that makes actual use of a ball, such as a basketball, too difficult for actual drills, techniques, and skill enhancement for fear of breaking those devices. In some instances, simply playing against a "wall" in a gym or outside if no other player is available may be the player's only option. Finally the current devices do not allow for the ability to pass balls in their functionalities.

The limitations of the current devices as well as other alternatives, such as trainers, time, space, and other individuals to play with have proven to be too much for athletes and players. The present device overcomes or reduces many of these limitations and gives an individual the needed coaching and training to develop the skill level necessary to excel in the game.

SUMMARY

The disclosure, in one respect, relates to a ball handling and passing station (the "Station") to enhance the skill sets of athletes in a plurality of sports. One sport in particular that may benefit greatly from the Station may be basketball. It will be appreciated that the same or similar device or apparatus or system may be used for many other sports including, but not limited to, baseball, football, soccer, tennis, racquetball, cricket, hockey, volleyball and many others.

The present embodiment may include a frame that may sit on the floor. The frame may be strong enough and stable enough to withstand the impact of sports equipment, such as a basketball or football. The frame may include a number of walls that may be positioned at different angles depending on the user's need as well as the user's skill level, development level or the desired exercise the user seeks to accomplish. The walls of the frame may be made of material that will provide enough recoil or bounce to project the object (i.e. basketball) that hits the wall back at the user.

The center wall may include a television (or TV) or other audio-visual device, or projecting device such as a computer screen or a projector screen. The TV display may be protected with a clear protective sheet or wall, such as Plexiglas or a polycarbonate sheet that allows a user to watch what is on the screen while providing enough stability and strength if impacted to prevent damage to the TV or other display. Also within the center wall may be a small computer or processor, such as an Intel NUC, Rasberry Pi, or other computer and processor, as well as a controller for the TV and the cables necessary to provide power to the electronic devices.

The Station may be secured to the floor or simply reside on the floor. The Station may be modular or in a single piece as well. Furthermore, the Station may be mobile or portable which may require wheels, or other means for easy transport, to be positioned at strategic locations on the Station and as will be further described herein.

DETAILED DESCRIPTION

Figure 1:
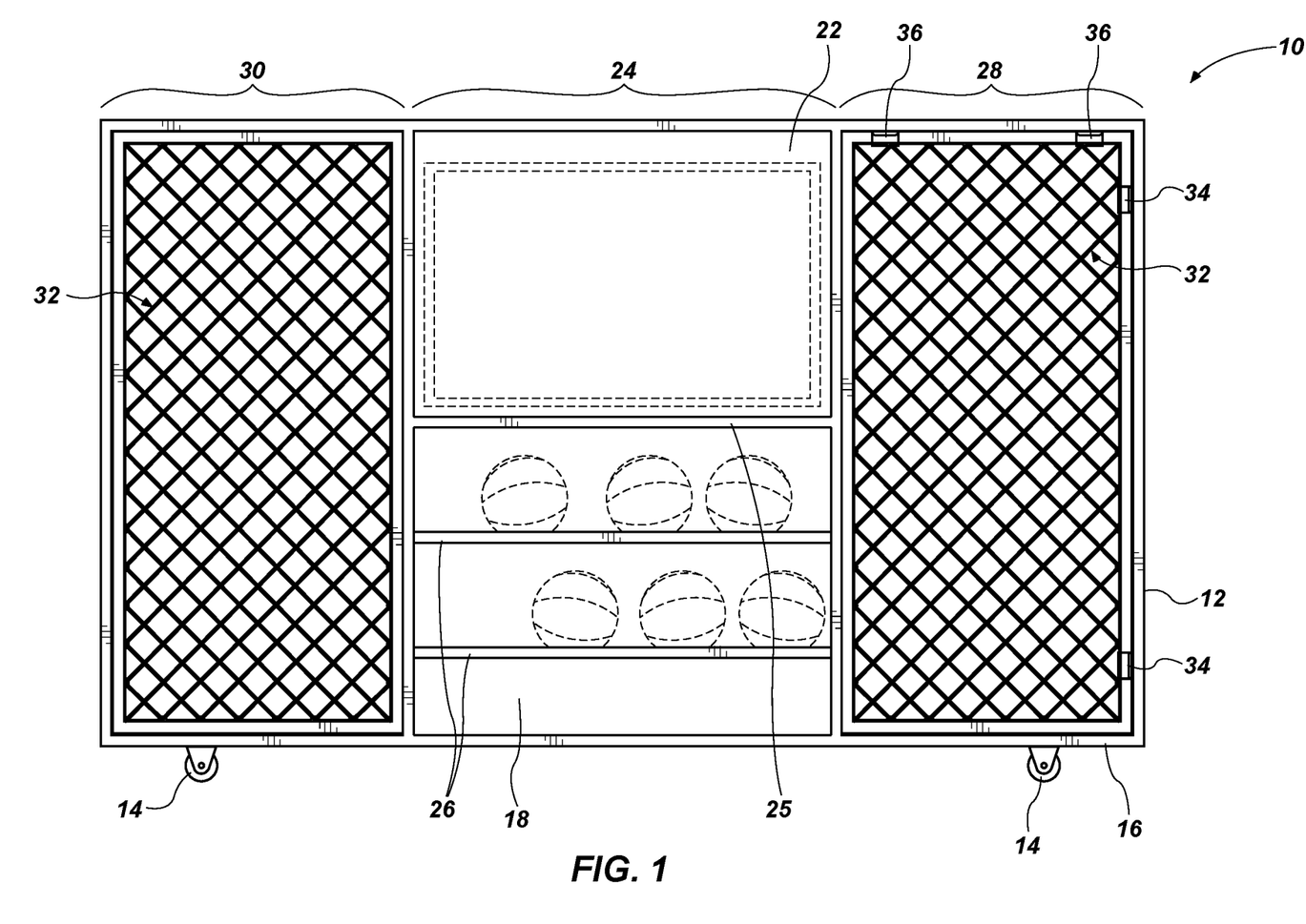
FIG. 1 illustrates a front view (or a back view) of the Station with a center wall a with a plurality of sections or portions.
Figure 2A:
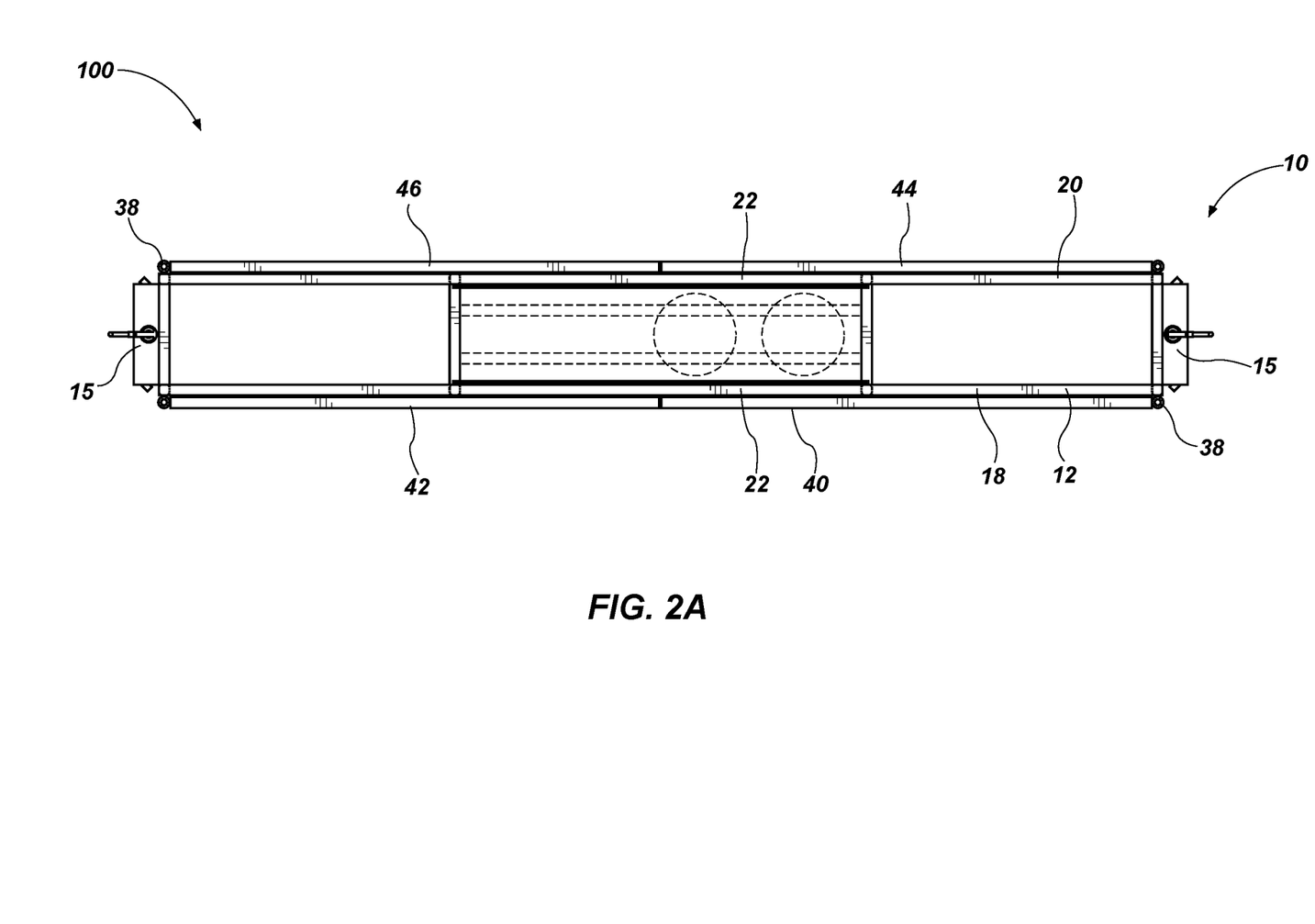
FIG. 2A, illustrates a top view of the Station of FIG. 1 in a closed configuration.
Figure 2B:
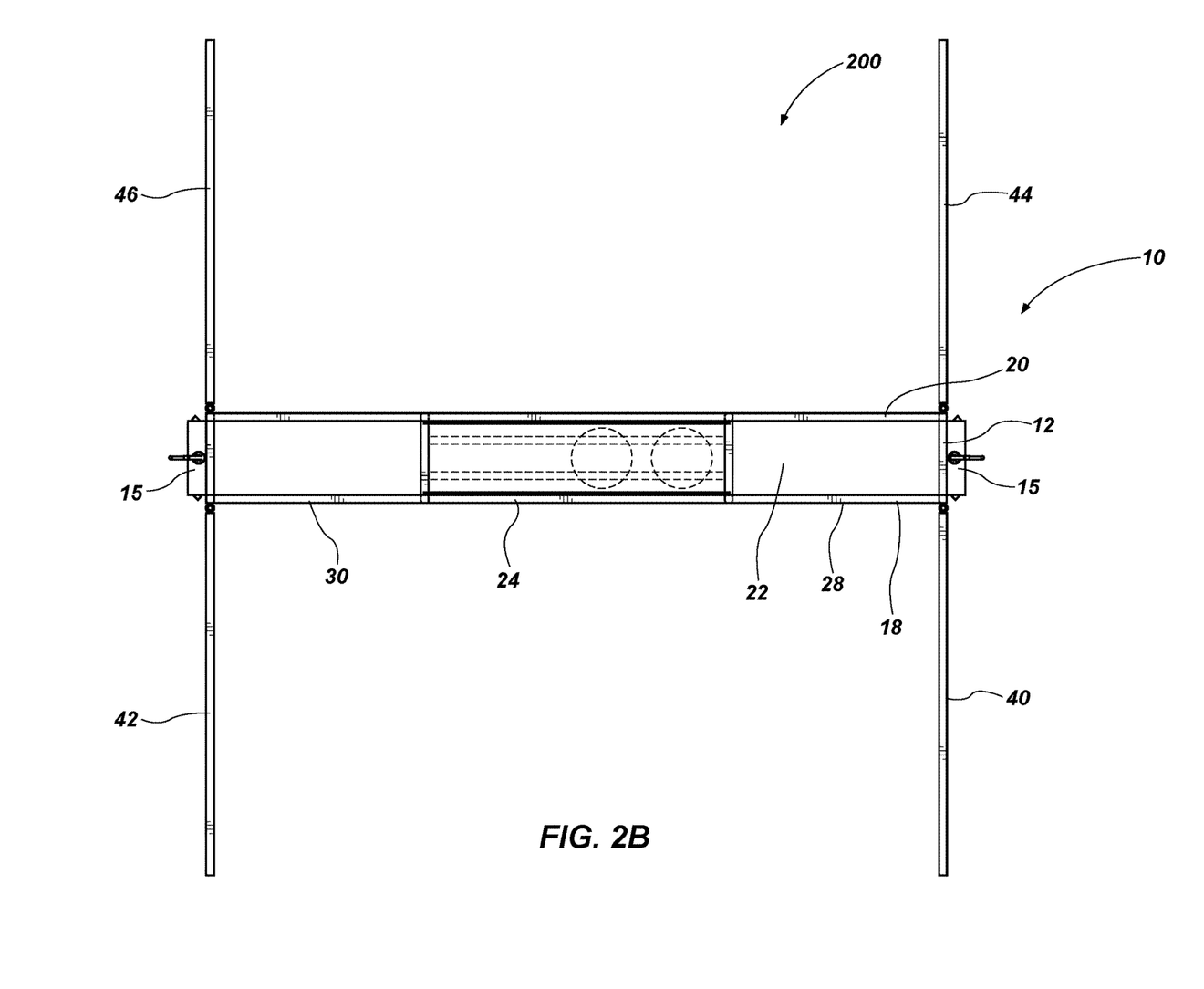
FIG. 2B, illustrates a top view of the Station of FIG. 1 in an open configuration.
Figure 3:
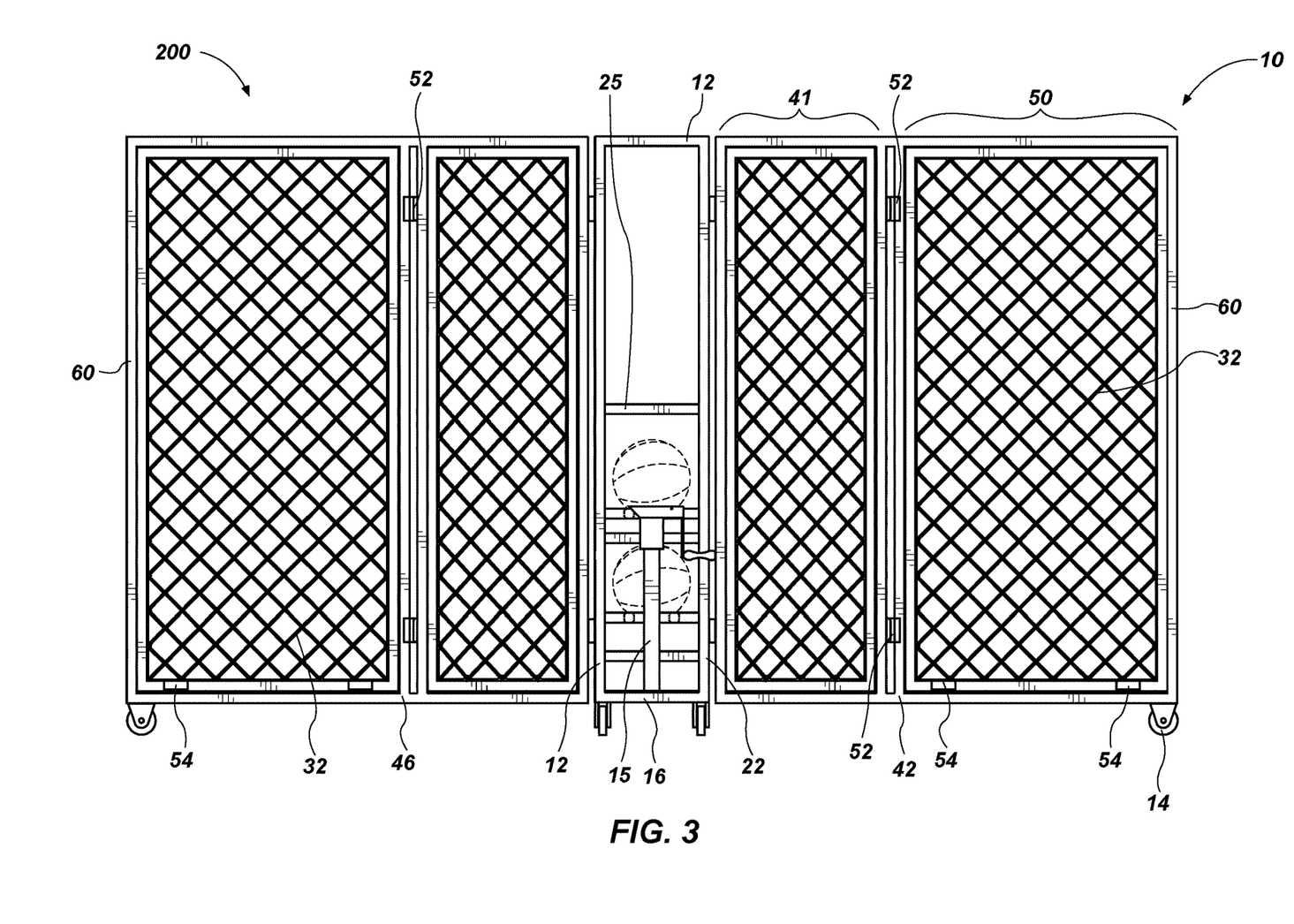
FIG. 3 illustrates a side view of the Station of FIG. 1 in an open configuration.

Referring to FIGS. 1-3, a ball handling and passing station 10, or system, may include a frame 12 which may be a steel skeleton with multiple bars, cross bars, poles, posts, or the like. The approximate measurements may be six (6) feet tall, ten (10) feet from one side to the other, and one (1) foot across in a closed configuration 100; however, the measurements may vary depending on the sport, the size of the facility where the system 10 resides, the size of the athlete, etc. The frame 12 may be secured to a floor, reside on top of a floor, or may be entirely portable. Wheels 14 may extend from a base 16 of the frame 12 and may be removable. The wheels 14 may be jacking caster wheels or attached to jacks 15 that allow the wheels 14 to retract and extend from the base 16. The wheels 14 may also include locks or a locking mechanism to prevent movement of the wheels 14 in the event the wheels 14 are not removed. Alternatively, the wheels 14 may be retractable into the frame 12 such that the frame 12 sits on the ground and the wheels 14 may be extended or retracted to allow portability.

The removable caster wheels 14 may enable the portability of the system 10. The casters may be removed using a lever and the system 10, with protective pads, (which may be, roughly, a quarter inch) is placed directly on a basketball court or other playing surface for strength and stability. The system 10 may include both a front 18 and a back 20 of a primary unit which may be the frame 12, or central frame. It will be apparent that the front 18 and the back 20 may be interchangeable. The front 18 may include a front wall 22, or center wall, that may be planar or substantially planar that may comprise three sections. A first section 24, or center section, may be roughly four (4) feet in width from the front 18 perspective. The exact dimensions of the first section 24 may be anywhere from two feet to six feet. The first section 24 may include a platform 25 that may be planar and capable of holding a significant weight. A television (TV) of sufficient size for a user/athlete to follow the on screen trainer or commands may be positioned on the platform 25. A 48-inch TV may be utilized however a television that is capable of fitting within the first section 24 and residing on the platform 25, even if smaller or larger than 48-inches is contemplated herein. The first section 24 may further included a polycarbonate sheet to protect the TV, an Intel® NUC or other CPU (or other computer readable medium with programming, including a Rasperry Pi or other CPU), a remote control for the TV, an HDMI cable or similar transmission cables, and power cables. It will be appreciated that this first section 24 is duplicated on the back 20 of the system or station 10. The power cables from each of the two back-to-back TV's and the two NUC's are connected to a power source, which may be a surge protector, which is connected to an electrical cord which runs to the nearest electrical outlet. Also positioned within the first section 24 may be storage racks 26, which may be positioned below, or underneath, the TVs and CPUs. The storage racks 26 may be capable of holding a plurality of items and may be racks that may easily hold balls, such as basketballs, soccer balls, and the like, or other sporting equipment, and may be able to hold anywhere from one to twenty basketballs. The storage racks 26 may be spaced in such a manner to allow for easy placement and removal of balls as well. The storage racks 26 may alternatively allow for placement and removal of balls without impacting the rack above or below or they may intentionally be spaced to allow pressedly fit or secure the balls within the storage racks 26.

The front 18 and back 20 may each be divided into three sections. A second section 28 may be to the right of the first section 24. The second section 28 may be, roughly, three (3) feet in width. A third section 30 may be to the left of the first section 24. The third section 30 may be, roughly, three (3) feet in width. Each of the first section 24, the second section 28 and the third section 30 may be six (6) feet in height. Each of the second section 28 and the third section 30 may comprise trampoline mesh 32, or reboundable material, tensioned with extension springs attached to the frame 12. Alternatively, bungee rope may be utilized in place of the trampoline mesh 32 or similar material with recoil or reboundable ability. In addition, the bungee rope and the trampoline mesh 32 may be used in tandem. Alternatively, walls of wood, metal, other mesh, spring, strings, or bungee cord that allow a ball or other athletic device to bounce or rebound off of the walls may be utilized as well. Alternative methods to secure the reboundable material 32 to the frame 12 may include welding, wrapping the reboundable material 32 around the frame 12, glue, tape, grips, vices, screws, bolts, hooks (with complementary holes in the frame 12), or any other method known in the art.

The second section 28 and the third section 30 may each include a plurality of lateral hinges 34 that may be positioned toward a lateral side of the frame 12 and toward a lateral side of the third section 30 or lateral side of the second section 28. These lateral hinges 34 may allow for the second and third sections 28, 30 to rotate to allow each of the second and third sections 28, 30 to rotate to a different angle relative to the frame 12. In addition there may be top hinges 36 toward the top of each of the second section 28 and third section 30. These top hinges 36 may allow for rotation of the respective sections 28, 30 in a different plane and at a different angle than the lateral hinges 34 and relative to the frame 12. The top hinges 36 may have an axis of rotation that is perpendicular, or substantially perpendicular, to the axis of rotation to frame hinges 38. Alternatively there may also be hinges on the bottom of each of the second section 28 and the third section 30 that can allow for rotation of each section in a different plane respective to the lateral hinges 34 and the top hinges 36, and relative to the frame 12, as well. The hinges may be standard door type hinges that are able to rotate about a single pivot axis. Each of the lateral hinges 34 and top hinges 36, may include a cross-bar or pin that allows the second section 28 (or the third section 30) to maintain its position once rotated about the hinges.

Referring to FIG. 2A, frame hinges 38 may be positioned toward the lateral edges of the frame 12. The frame hinges 38 join, or connect, the frame 12 to a first wall 40, on one side of the frame 12 and a second wall 42, opposite the first wall 40 on the other side of the frame 12. Each of the walls 40, 42 may extend from the front wall 22 of the front 18. A third wall 44 and a fourth wall 46 may engage frame hinges 38 similarly and extend from the back 20 instead of the front 18, understanding that the front 18 and the back 20 are interchangeable. The frame hinges 38 may extend the height of the frame 12 or they may be a plurality of smaller hinges strategically placed along the frame and the walls 40, 42, 44, 46.

Referring to FIG. 2B, the first wall 40 may rotate away from the frame 12 about the frame hinges 38 with a first axis. The second wall 42 may rotate away from the center wall 22 about the frame hinges 38 with a second axis that may be parallel to the first axis. The first wall 40 and second wall 42 essentially rotate away from one another moving from a closed configuration 100 (as set forth in FIG. 2A) to an open configuration 200 (as set forth in FIG. 2B). The front 18 and back 20 may each be opened to create a handling and passing area (for the sport of basketball, for example) that may be substantially U-shaped from a top perspective.

Figure 4:
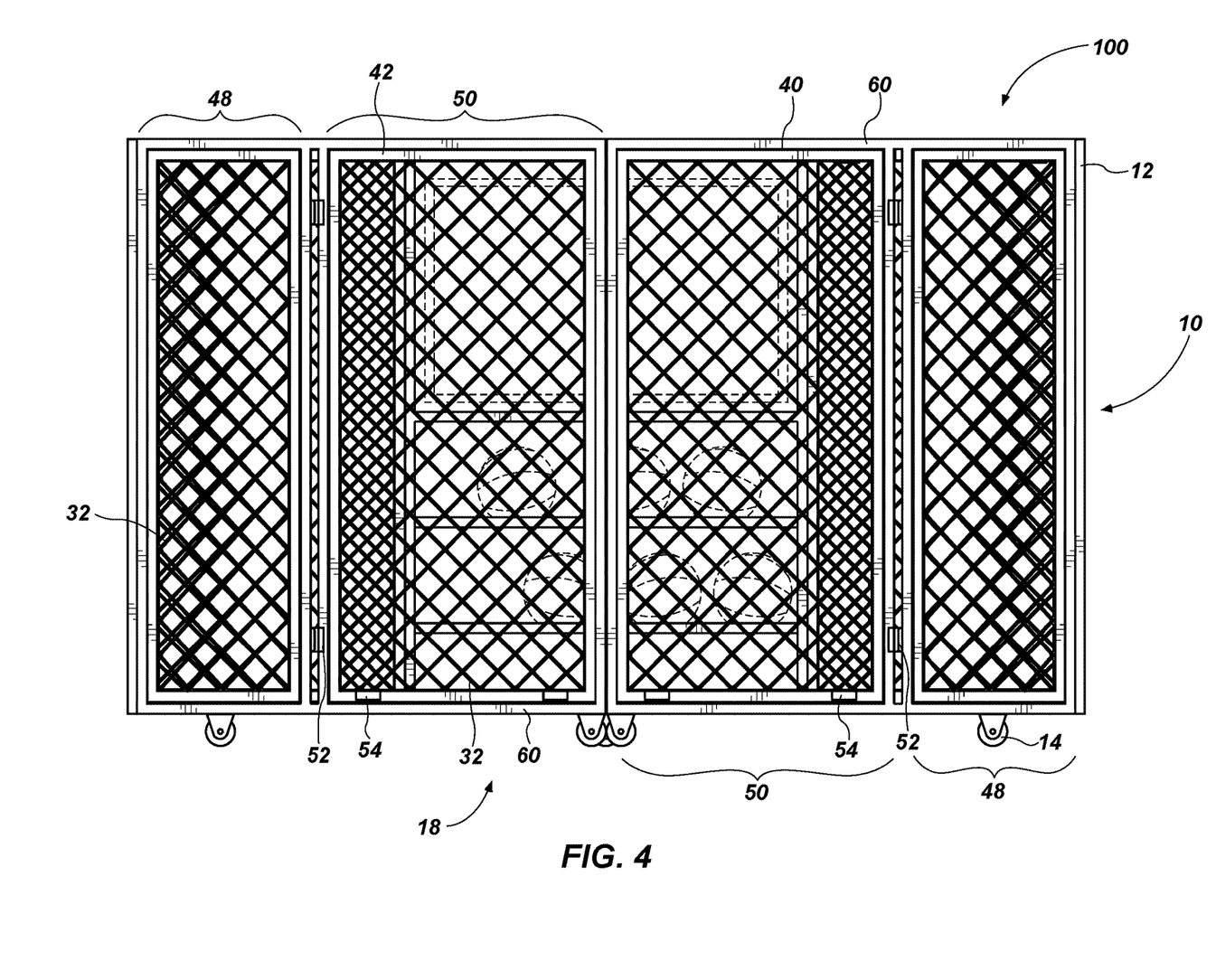
FIG. 4 illustrates a front view (or back view) of the Station of FIG. 1, in a closed configuration, with wheels on the Station.
Figure 5:
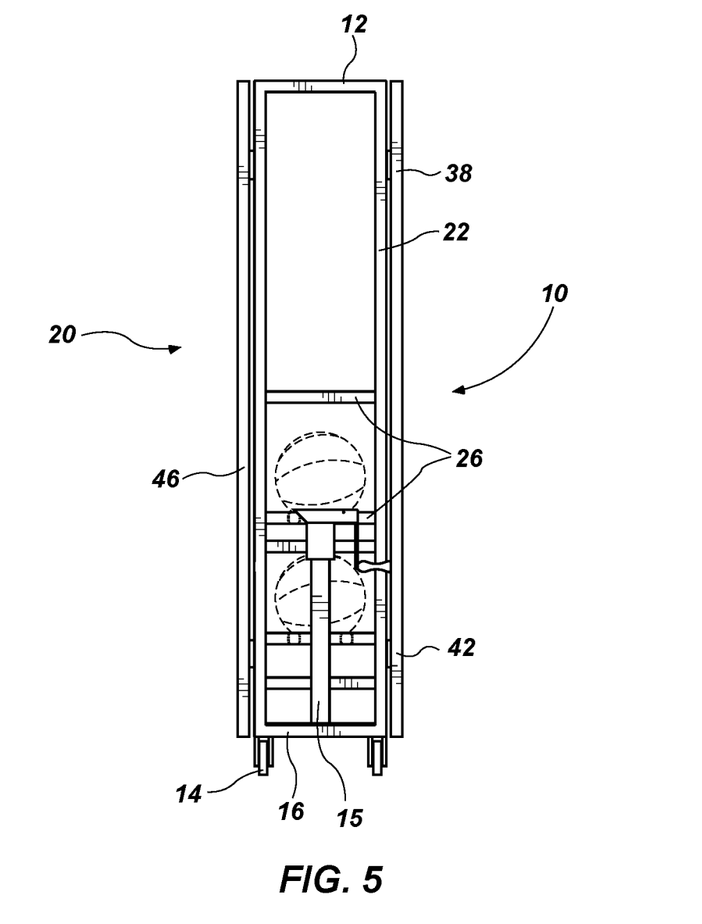
FIG. 5 illustrates a side view of the Station of FIG. 4 in a closed configuration.
Figure 6:
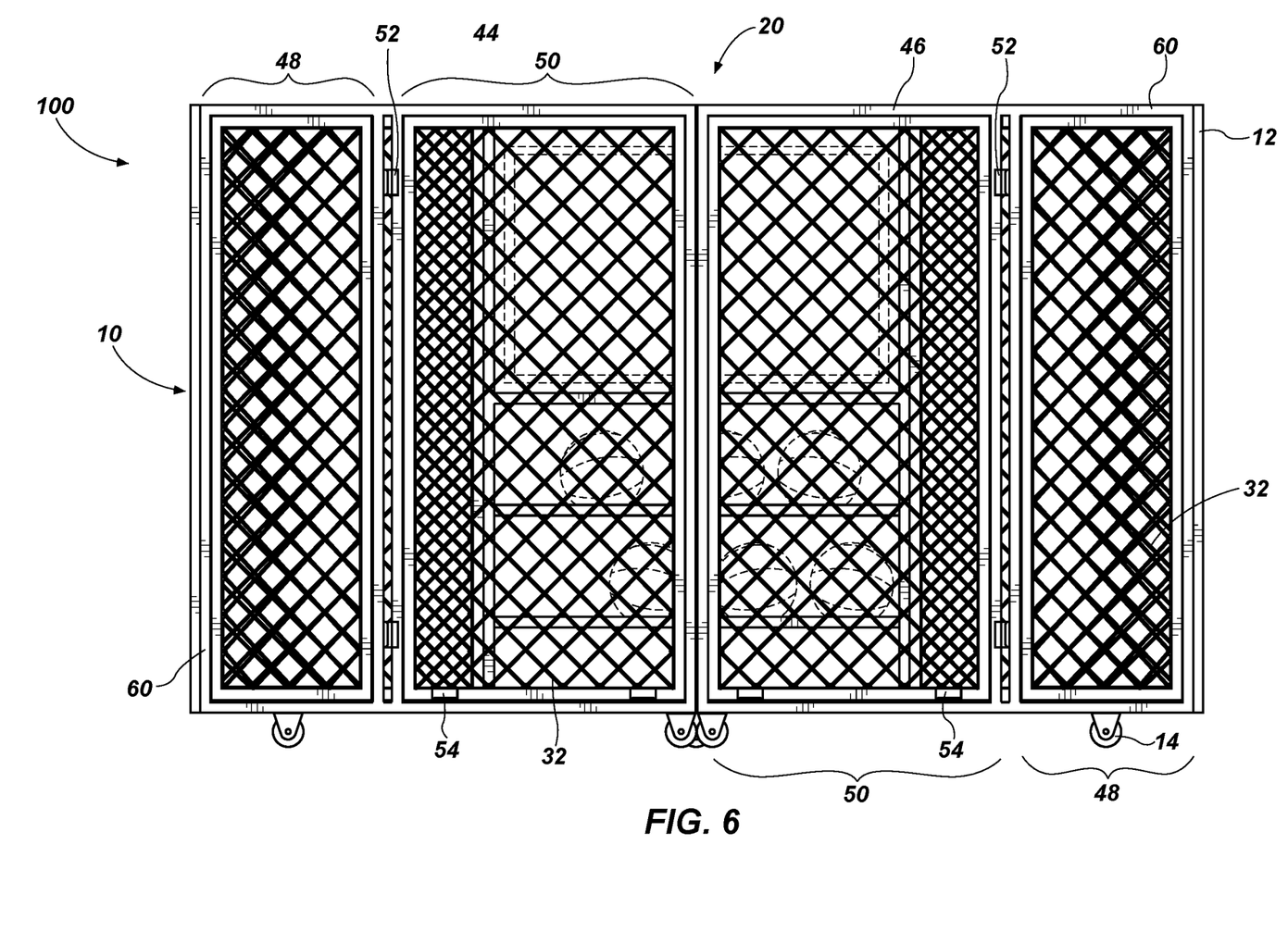
FIG. 6 illustrates a back view of the Station of FIG. 4, in a closed configuration.

Referring to FIGS. 4-6, the walls 40, 42, 44, 46 may be securely fastened to the center wall 22 when in a closed configuration 100. Velcro® straps may be used to fasten the walls 40, 42, 44, 46 to the center wall 22 or other suitable means that prevents the walls 40, 42, 44, 46 from swinging away from the center wall 22. With the system 10 in a closed configuration 100 it may allow for ease in storage or transport.

Figure 7:
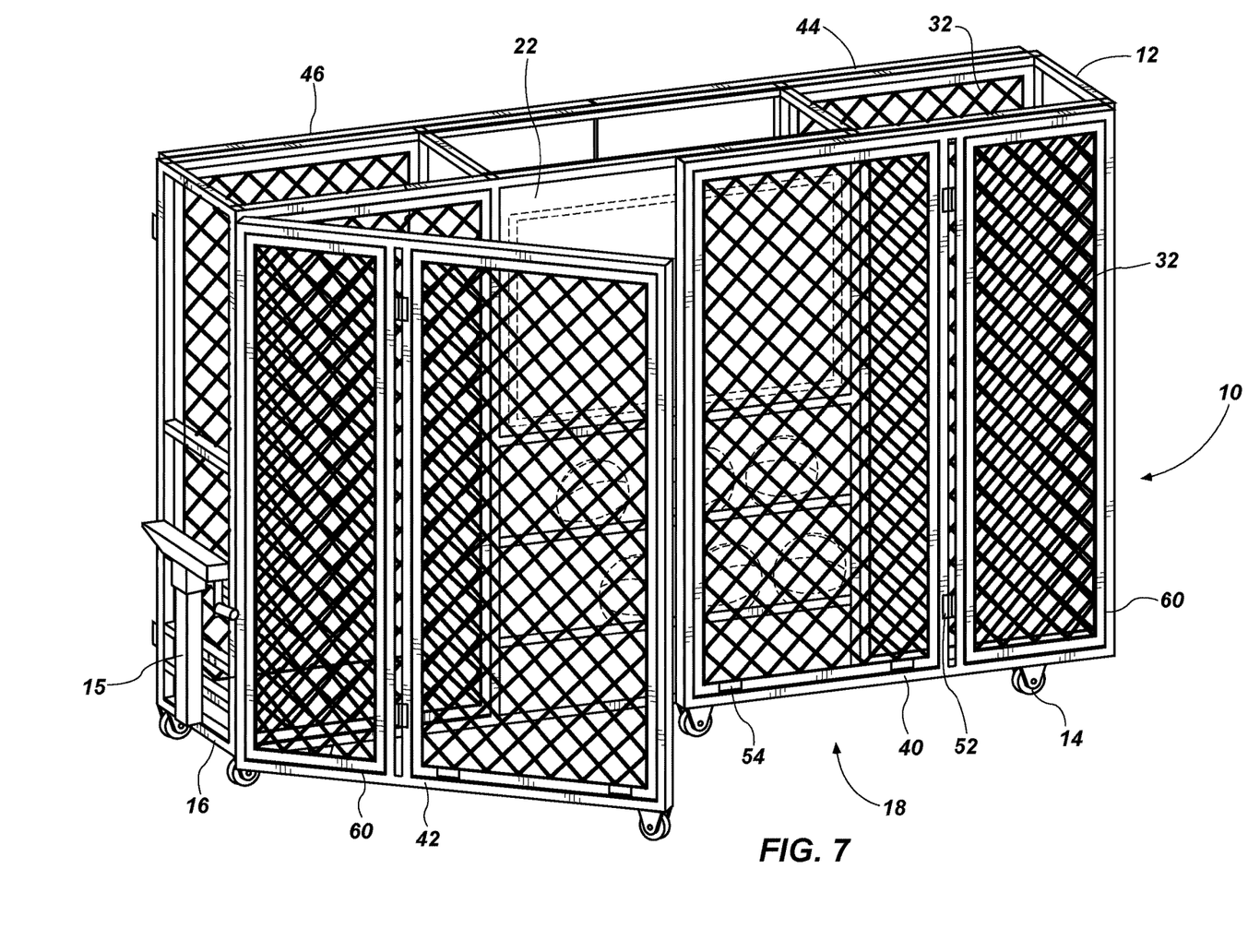
FIG. 7 illustrates a perspective view of the Station of FIG. 6 with the one of the walls being "opened" up.
Figure 8:
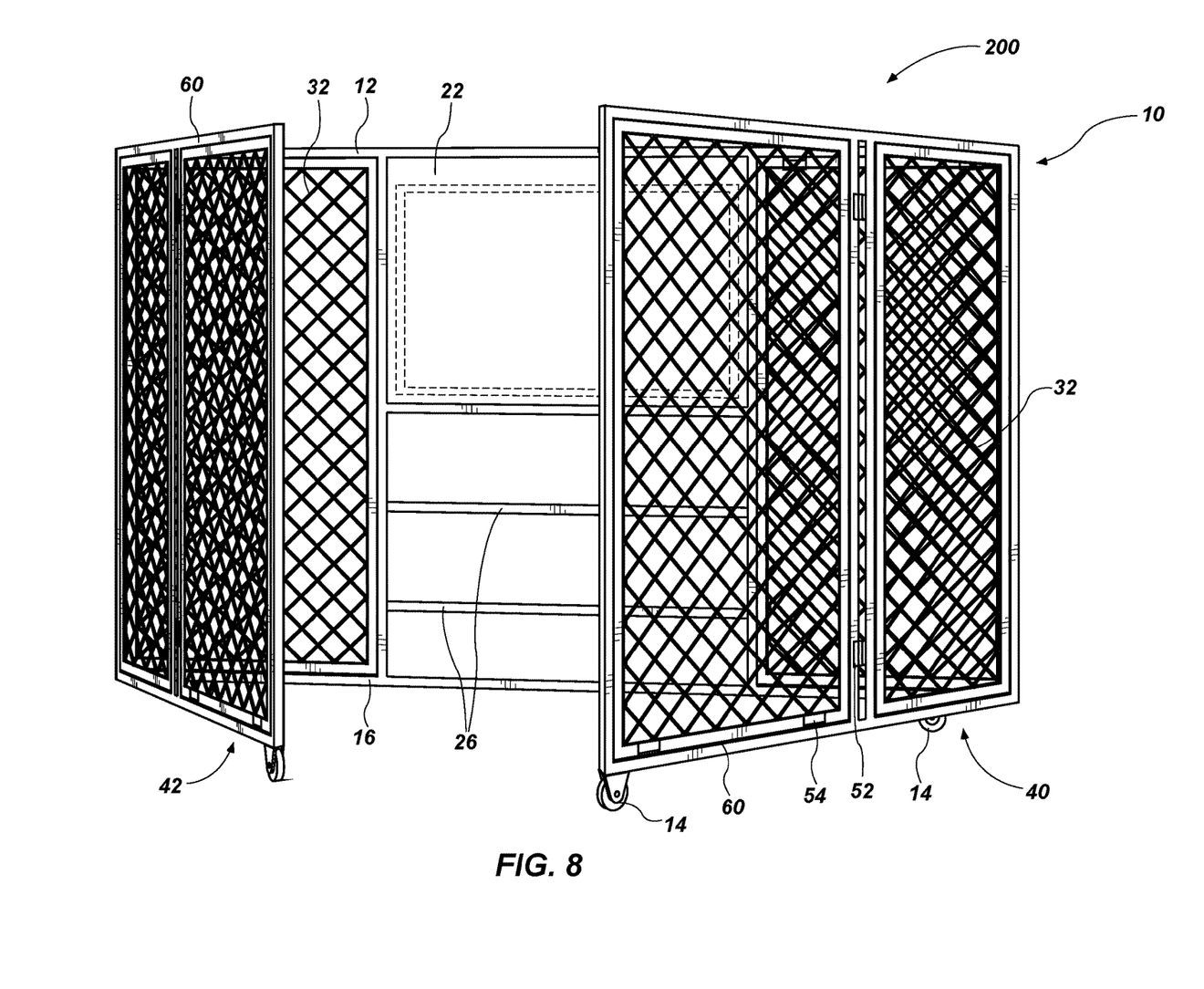
FIG. 8 illustrates a perspective view of the Station of FIG. 6 with the two of the walls being "opened" up.
Figure 9:
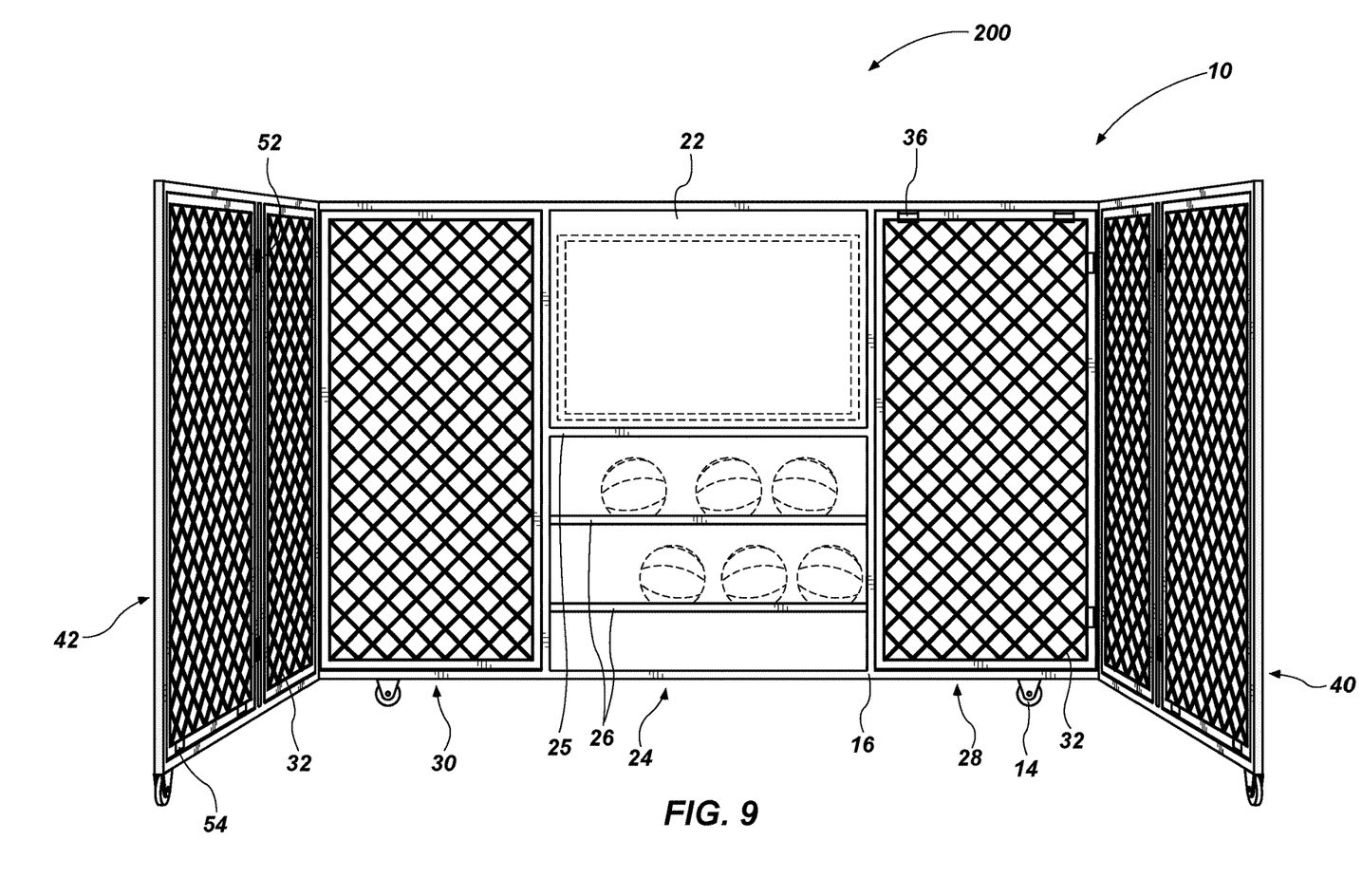
FIG. 9 illustrates a front perspective view of the Station of FIG. 6 with the Station "opened" up in a first configuration.

Referring to FIGS. 7-9, the walls 40, 42, 44, 46 rotate away from the center wall 22 and may create a "cage" or play area for a user or athlete to operate within. The walls 40, 42, 44, 46 may be positioned at any angle from 0 degrees to 180 degrees from the center wall depending on the user/athletes preference.

Each of the walls 40, 42, 44, 46 may be substantially frame like. The walls 40, 42, 44, 46 may each be comprised of the reboundable material 32 which is attached to the walls 40, 42, 44, 46 with extension springs spaced evenly around the walls 40, 42, 44, 46, which may be anywhere from every 3 inches to every 18 inches. Alternatively bungee rope may be utilized in place of the trampoline mesh or similar material with recoil or reboundable ability. In addition the bungee rope and the trampoline mesh may be used in tandem. Alternatively walls of wood or metal or other mesh or spring or strings or bungee cord that allow a ball or other athletic device to bounce or rebound off of the walls may be utilized as well.

Referring to FIG. 3, for ease in describing the walls 40, 42, 44, 46, the second wall 42 will be discussed and described; however, each of the walls 40, 44, 46 may comprise substantially the same, the same, or similar features. Each of the walls 40, 42, 44, 46 may comprise a wall frame 60 that may extend around the exterior of the wall and maintain the reboundable material 32. The wall frame 60 may also extend between each wall portion(s) (described further herein). The second wall 42 may be, roughly, five (5) feet in length thus allowing the second wall 42 and the first wall 40 to rotate into the center wall 22 without overlapping. However, the first wall 40 and the second wall 42 may each be longer than the system 10, allowing for overlap of the walls 40, 42 in a closed configuration 100. Alternatively the walls 40, 42 may each be shorter as well and may not traverse the enter space between the roughly ten (10) foot frame 12. Third and fourth walls 44, 46 may be similarly positioned and sized as well.

The second wall 42 may include a first portion 48 and a second portion 50. The first portion 48 may be proximal the second portion 50 with the first portion 48 closer to the frame hinge 38. The second portion 50 is distal the first portion 48 and may be closer to the end of the second wall 42. The first portion 48 may be smaller in width than the second portion 50 wherein the first portion 48 may be, roughly, two (2) feet in width and the second portion 50 may be, roughly, three (3) feet in width. The second portion 50 may be hingedly connected to the second wall 42 in a plurality of locations. A first set of hinges 52 may be positioned between the first portion 48 and the second portion 50 and allow the second portion 50 to rotate about the first set of hinges 52. The first set of hinges 52 may pivot on an axis that is substantially parallel, or parallel to the frame hinges 38. Alternatively, the first set of hinges 52 may allow for the reboundable material 32 on the interior of the second portion 50 to rotate within the second wall 42.

A second set of hinges 54 may be positioned at the bottom of the second wall 42. The second set of hinges may allow for the second portion 50 to rotate about an axis that may be perpendicular, or substantially perpendicular, to the axis of the first set of hinges 52 and allow the second portion 50 to rotate in a separate plane, allowing the second portion 50 to rotate from 0° to 45° relative to the second wall 42. It will be appreciate that another set of hinges may positioned toward the top of the second wall 42 in the second portion 50 and may functionally similarly to the second set of hinges 54; however, rotating the second portion in an opposite manner as the second set of hinges 54 because of their placement at the top instead of the bottom. Each of the first set of hinges 52 and second set of hinges 54 may include a cross-bar or pin that allows the second portion 50 to maintain its position once rotated about the hinges 52, 54.

The Station or system 10 may be required to be built of robust enough materials such that it can withstand the force of use of balls and other equipment hitting, bouncing and rebounding off of the Station system 10. Strong materials other than steel may be utilized so long as the system 10 is weighted down or secured to the floor and many alternatives are contemplated herein.

The system 10 allows users/athletes to achieve massive repetitions of skills including basketball ball handling and passing drills. Each side of the system 10 may accommodate one or more users/athletes. Each athlete mimics the ball handling and passing skills demonstrated by a virtual coach on the TV screen. Athletes on each side of the system 10 train independently at their own skill level and speed.

A virtual coach may demonstrate a certain skill on the TV within the system 10. A user/athlete may repeat that skill at the athlete's own pace and until each skill is part of that athletes "muscle memory." Drills may include numerous types of passing. The two sections, the second section 28 and the third section 30 of the front, or center, wall 22 on either side of the first, or center, section 24 may mimic and act as pass returners directly in front of the athlete. Each of the walls 40, 42, 44, 46 may also mimic and act as pass returners to the side of the athlete. As an athlete follows the virtual coach in a ball handling and passing drill (e.g. basketball), the athlete will both dribble the basketball and pass it to one of the two front pass returners or to one of the side pass returners. The second portions 50 of the walls 40, 42, 44, 46 may also provide active return of the ball by rotating the second portions 50 about the second set of hinges 54 to angle the second portion 50, allowing the ball to "pop up" and back to the user or athlete.

While the present embodiment depicts one or more embodiments for an athletic station, alternatives are contemplated herein specifically with regard to dimensions and materials and are considered part of this disclosure.

Although the foregoing disclosure provides many specifics, these should not be construed as limiting the scope any of the ensuing claims. Other embodiments may be devised which do not depart from the scopes of the claims. Features from different embodiments may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:
1. A system for athletic use comprising:
   a central frame comprising:
      a front of the central frame spaced apart from a back of the central frame, wherein the front and the back are interchangeable;
      each of the front of the central frame and the back of the central frame comprising a separate center wall with at least three sections;

at least one storage rack positioned between the front of the central frame and the back of the central frame and further positioned toward a base of the central frame accessible from the front of the central frame and the back of the central frame;

a first wall and a second wall extending from and hingedly connected to the central frame; the second wall comprising:
  a first portion; and
  a second portion, separate from and larger than the first portion, wherein the second portion is pivotally engaged to a first wall frame and is configured to rotate within the first wall frame from 0° and 45° relative to the first wall; and
a bungee cord extending in a cross-sectional pattern between portions of the separate center wall, and a separate reboundable mesh extending between portions of the first wall and the second wall.

2. The system of claim 1, wherein the separate center wall comprises the reboundable mesh in at least two of the at least three sections.

3. The system of claim 1, wherein the separate center wall comprises a platform and racks and at least one audio-visual unit.

4. The system of claim 1, wherein the first wall is pivotally connected toward one lateral end of the central frame and may rotate toward or away from the separate center wall between 0° and 180°.

5. The system of claim 4, wherein the second wall is pivotally connected toward one lateral end of the central frame, opposite the first wall, and may rotate toward or away from the separate center wall between 0° and 180°.

6. The system of claim 1, wherein the first wall further comprises:
  a first portion; and
  a second portion, separate from and larger than the first portion, wherein the second portion is pivotally engaged to the first wall frame and is configured to rotate within the first wall frame from 0° and 45° relative to the first portion.

7. The system of claim 1 further comprising:
  a third wall and a fourth wall extending from and hingedly connected to the central frame; and
  the bungee cord extending in a cross-sectional pattern between portions of the third wall and the fourth wall.

8. The system of claim 7, wherein the first wall and the third wall are separately pivotally connected to the central frame toward a first lateral end of the central frame.

9. The system of claim 8, wherein the second wall and fourth wall are separately pivotally connected to the central frame toward a second lateral end of the frame.

10. The system of claim 1 comprising: the at least one storage rack positioned toward a base of the center wall extending at least partially along the center wall.

11. An athletic training system comprising:
  a frame comprising:
    a primary unit with a front wall and a back wall with a space there between, wherein the front wall and the back wall are interchangeable, wherein each of the front wall and the back wall comprise a plurality of sections, wherein portions of the front wall and the back wall each comprise a series of bungee rope extending in a cross-sectional pattern;
    at least one storage rack positioned between the front wall and the back wall and toward a base of the primary unit, wherein the at least one storage rack is accessible from the front wall and the back wall;
    a first wall and a second wall pivotally connected to the front wall; and
    a third wall and a fourth wall pivotally connected to the back wall, wherein the first wall and the third wall are positioned toward a first lateral end of the frame and the second wall and the fourth wall are positioned toward a second lateral end of the frame, opposite the first lateral end; wherein each of the first wall, the second wall, the third wall and the fourth wall comprises a proximal section and a separated distal section relative to the front and back walls, respectively.

12. The system of claim 11, wherein the plurality of sections comprises at least three asymmetric sections.

13. The system of claim 12, wherein at least two sections of the at least three asymmetric sections comprise the series of bungee rope extending the length of the at least two sections.

14. The system of claim 11, wherein a reboundable mesh, separate from the series of bungee rope, extends at least partially across the first wall, the second wall, the third wall and the fourth wall.

15. The system of claim 11, wherein each of the first wall and the second wall are configured to rotate toward and away from the front wall between 0° and 180°; and
  wherein each of the third wall and the fourth wall is configured to rotate toward and away from the back wall between 0° and 180°.

16. The system of claim 11, wherein each separated distal section of each of the first wall, the second wall, the third wall and the fourth wall is pivotally connected to a bottom side of the respective wall and is configured to rotate from 0° and 45° relative to the respective wall.

17. The system of claim 11 comprising: the at least one storage rack positioned toward a base of the front wall and the back wall and extending at least partially along the front wall and the back wall.

18. The system of claim 11, wherein the front wall and the back wall each comprises a platform and at least one audio-visual unit.

19. A system for athletic use comprising:
  a frame comprising:
    a front of the frame spaced apart from a back of the frame; the front and the back of the frame being interchangeable;
    each of the front of the frame and the back of the frame being divided into three sections and comprising a first center section, a second section located to one lateral side of the first center section, and a third section located to another lateral side of the first center section and opposite to the one lateral side;
    each of the second section and the third section including a plurality of lateral hinges having an axis of rotation and positioned respectively toward lateral sides of the frame and toward a lateral side of the second section and a lateral side of the third section; wherein the plurality of lateral hinges enables the second section and the third section to rotate at an angle relative to the frame;
    at least one of the second section or the third section including top hinges or bottom hinges having an axis of rotation oriented substantially perpendicular to the axis of rotation of the plurality of lateral hinges, wherein the top hinges or bottom hinges enable rotation of the second section or the third section relative to the frame in a different plane and at a different angle than the plurality of lateral hinges and relative to the frame;

a first wall and a second wall extending respectively from and hingedly connected to the lateral sides of the frame, wherein the first wall is connected to rotate away from the first center section about a first axis; the second wall is connected to rotate away from the first center section about a second axis that is parallel to the first axis; wherein the first wall and the second wall rotate toward or away from one another to form a closed configuration or an open configuration, respectively, with respect to the three sections of the frame;

the first center section of each of the front of the frame and the back of the frame comprising a platform capable of supporting at least one audio-visual unit;

a plurality of storage racks spaced apart and positioned between the front of the frame and the back of the frame; at least one of the plurality of storage racks positioned toward a base of the first center section and accessible from the front of the frame and the back of the frame; and a bungee cord material extending in a pattern along portions of the second section and the third section, and a separate reboundable mesh material extending along portions of the first wall and the second wall.

* * * * *